United States Patent
Wang et al.

(10) Patent No.: US 10,896,232 B2
(45) Date of Patent: Jan. 19, 2021

(54) GENERATING RECOMMENDATIONS BASED ON HUMAN-CURATED LISTS

(71) Applicant: FUJITSU LIMITED, Kawasaki (JP)

(72) Inventors: Jun Wang, San Jose, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 341 days.

(21) Appl. No.: 15/904,154

(22) Filed: Feb. 23, 2018

(65) Prior Publication Data

US 2019/0266285 A1    Aug. 29, 2019

(51) Int. Cl.
G06F 16/9535    (2019.01)
G06F 16/958    (2019.01)
G06F 16/2457    (2019.01)

(52) U.S. Cl.
CPC .... *G06F 16/9535* (2019.01); *G06F 16/24578* (2019.01); *G06F 16/958* (2019.01)

(58) Field of Classification Search
CPC ............... G06F 16/9535; G06F 16/958; G06F 16/24578; G06F 16/9536
USPC .......................................................... 707/734
See application file for complete search history.

(56) References Cited

U.S. PATENT DOCUMENTS

| | | | |
|---|---|---|---|
| 7,949,659 B2 | 5/2011 | Chakrabarti et al. | |
| 9,390,166 B2 | 7/2016 | Wang et al. | |
| 9,454,612 B2 | 9/2016 | Wang et al. | |
| 9,495,460 B2 | 11/2016 | Taylor et al. | |
| 9,589,061 B2 | 3/2017 | Wang et al. | |
| 2015/0066917 A1* | 3/2015 | Wang | G06F 16/9535 707/723 |
| 2015/0286736 A1* | 10/2015 | Wang | G06F 16/954 707/741 |

OTHER PUBLICATIONS

Zhang et al., "Automatic Extraction of Top-k Lists from the Web" (Microsoft in ICDE-2013 conference), Apr. 8, 2013.
Chakrabarti et al., "Ranking Objects by Exploiting Relationships: Computing Top-K over Aggregation" (SIGMOD) Jan. 1, 2006.

* cited by examiner

*Primary Examiner* — Michael Pham
(74) *Attorney, Agent, or Firm* — Maschoff Brennan

(57) ABSTRACT

A method of generating a recommendation for an item is provided. A method may include receiving search results based on a query for an item. The method may also include identifying a plurality of human-curated lists from the search results, wherein each human-curated list of the plurality of human-curated lists includes a plurality of human-recommended items. Further, the method may include determining, via the at least one processor, one or more scores associated with at least one of the plurality of human-curated lists and the plurality of human-recommended items. The method may further include generating, via the at least one processor, a recommendation including at least one recommended item based on the determined one or more scores. Furthermore, the method may include displaying the recommendation for the item.

16 Claims, 8 Drawing Sheets

GENERATING RECOMMENDATIONS BASED ON HUMAN-CURATED LISTS

FIELD

The embodiments discussed herein relate to generating recommendations based on human-curated lists.

BACKGROUND

Human-curated lists, such as lists of top products (e.g., electronics and/or applications), establishments (e.g., restaurants), and/or services (e.g., yard care services) are available online and may be useful resources (e.g., for potential consumers).

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include receiving, via at least one processor, search results based on a query for an item. The method may also include identifying, via the at least one processor, a plurality of human-curated lists from the search results, wherein each human-curated list of the plurality of human-curated lists includes a plurality of human-recommended items. Further, the method may include determining, via the at least one processor, one or more scores associated with at least one of the plurality of human-curated lists and the plurality of human-recommended items. The method may further include generating, via the at least one processor, a recommendation including at least one recommended item based on the determined one or more scores. Furthermore, the method may include displaying, via the at least one processor, the recommendation.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Various embodiments discussed herein relate to identifying one or more human-curated lists (e.g., top-k lists) for specific items, and generating one or more recommendations for specific items based on the one or more human-curated lists.

With the advent of computer networks, such as the Internet, and the growth of technology, more and more information is available to more and more people. For example, human-curated lists, such as lists of top products and/or services are available online. For example, a user may be able to access numerous human-curated lists for a good and/or a service. More specifically, in response to an Internet search (e.g., a query) of "top video players," a user may receive numerous search results including lists of human-curated "top" video players, wherein each list may not identify the same "top" video players. Due to the enormous amount of information, it may be challenging and time-consuming for a user to even review the lists. Further, it may be difficult, if not impossible, for the user to determine what online information is or is not reliable.

Various embodiments disclosed herein may generate a recommendation for an item based on one or more analyses of the human-curated lists and/or specific items identified in the human-curated lists. Due to the diverse nature of the analyses, the generated recommendation may be a reliable source of information (e.g., for a user) concerning the item. Thus, various embodiments may enable a user to receive a recommendation and select an item (e.g., for purchase) without a need to review each human-curated list.

Thus, various embodiments of the present disclosure, as described more fully herein, provide a technical solution to one or more problems that arise from technology that could not reasonably be performed by a person, and various embodiments disclosed herein are rooted in computer technology in order to overcome the problems and/or challenges described above. Further, at least some embodiments disclosed herein may improve computer-related technology by allowing computer performance of a function not previously performable by a computer.

Embodiments of the present disclosure will be explained with reference to the accompanying drawings.

Figure 1:
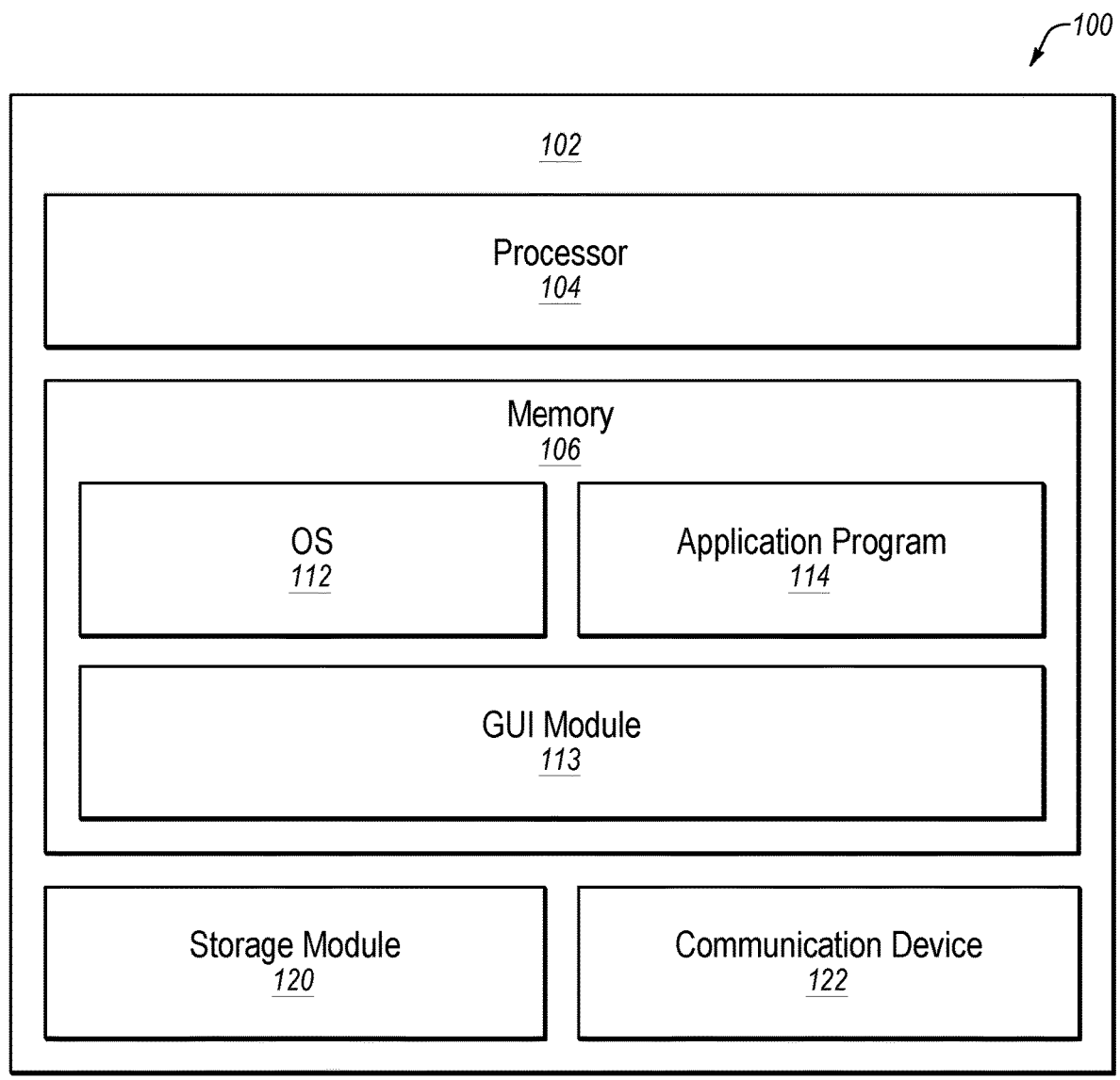
FIG. 1 is a diagram representing an example system configured to generate recommendations based on human-curated lists.

FIG. 1 is a block diagram of an example recommendation system 100, arranged in accordance with one or more embodiments of the present disclosure. Recommendation system 100 may include a computing system 102, which may include a processor 104, memory 106, a storage module 120, and a communication device 122. Computing system 102 may include a desktop computer, a laptop computer, a server computer, a tablet computer, a mobile phone, a smartphone, a personal digital assistant (PDA), an e-reader device, a network switch, a network router, a network hub, other networking devices, or other suitable computing system.

Processor 104, storage module 120, memory 106, and/or communication device 122 may all be communicatively coupled such that each of the components may communicate with the other components. System 100 may perform any of the operations described in the present disclosure.

In general, processor 104 may include any suitable special-purpose or general-purpose computer, computing entity, or processing device including various computer hardware or software modules and may be configured to execute instructions stored on any applicable computer-readable storage media. For example, processor 104 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1, processor 104 may include any number of processors configured to perform, individually or collectively, any number of operations described in the present disclosure.

In some embodiments, processor 104 may interpret and/or execute program instructions and/or process data stored in storage module 120, memory 106, or both. In some embodiments, processor 104 may fetch program instructions from storage module 120 and load the program instructions in memory 106. After the program instructions are loaded into memory 106, processor 104 may execute the program instructions.

For example, in some embodiments one or more of the processing operations of a device and/or system (e.g., an application program, a server, etc.) may be included in storage module 120 as program instructions. Processor 104 may fetch the program instructions of one or more of the processing operations and may load the program instructions of the processing operations in memory 106. After the program instructions of the processing operations are loaded into memory 106, processor 104 may execute the program instructions such that system 100 may implement the operations associated with the processing operations as directed by the program instructions.

Storage module 120 and/or memory 106 may include computer-readable storage media for carrying or having computer-executable instructions or data structures stored thereon. Such computer-readable storage media may include any available media that may be accessed by a general-purpose or special-purpose computer, such as processor 104. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 104 to perform a certain operation or group of operations.

In some embodiments, storage module 120 and/or memory 104 may store data related to a recommendation system configured to generate a recommendation for an item. For example, storage module 120 and/or memory 106 may store search queries, search results (e.g., webpages, metadata of webpages), list data (e.g., list-specific scores), item data (e.g., item-specific scores, integrated item scores), or any other data related to and/or used by a recommendation system.

As used herein, the term "item" may refer to a good (e.g., a car, a video player, coat, etc.), a service (e.g., legal services, HVAC services, computer repair, etc.), and/or an establishment offering a good and/or a service (e.g., restaurant, movie theater, auto dealership, etc.).

Communication device 122 may include any device, system, component, or collection of components configured to allow or facilitate communication between system 102 and another electronic device. For example, communication device 122 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 122 may permit data to be exchanged with any network such as a cellular network, a Wi-Fi network, a MAN, an optical network, etc., to name a few examples, and/or any other devices described in the present disclosure, including remote devices.

As used herein, the terms "module" or "component" may refer to specific hardware implementations configured to perform the operations of the module or component and/or software objects or software routines that may be stored on and/or executed by, for example, recommendation system 100. In some embodiments, the different components and modules described herein may be implemented as objects or processes that execute on a computing system (e.g., as separate threads). While some of the system and methods described herein are generally described as being implemented in software (stored on and/or executed by system 100), specific hardware implementations or a combination of software and specific hardware implementations are also possible and contemplated. In this description, a "computing entity" may include any computing system as defined herein, or any module or combination of modules running on a system, such as system 100.

Generally, computing system 102 may operate under control of an operating system 112 stored in memory 106, and interface with one or more users to accept inputs and commands and to present outputs through GUI module 113. In at least some embodiments, computing system 102 may be operably coupled to one or more displays (not shown in FIG. 1) configured to display data (e.g., a recommendation) to a user via a GUI of GUI module 113.

Although GUI module 113 is depicted as a separate module, the instructions performing the GUI functions may be resident or distributed in operating system (OS) 112, an application program 114, or implemented with special purpose memory and processors. Computer system 102 may also implement a compiler (not shown in FIG. 1) that allows application program 114 written in a programming language to be translated into processor 104 readable code. After completion, application program 114 may access and manipulate data stored in memory 106 of computing system 102 using the relationships and logic that are generated using the compiler.

Further, operating system 112 and application program 114 may include instructions that, when read and executed by computing system 102, may cause computing system 102 to perform the steps necessary to implement and/or use embodiments of the present disclosure. Application program 114 and/or operating instructions may also be tangibly embodied in memory 106 and/or data communications devices, thereby making a computer program product or article of manufacture according to one or more embodiments of the disclosure. As such, the term "application program" as used herein is intended to encompass a computer program accessible from any computer readable device or media. Application program 114, which may include one or more application programs may exist on client (user) device (e.g., a personal computer, mobile device, etc.). Furthermore, portions of application program 114 may be distributed such that some or all of application program 114 may be included on another device, such as a server, which may be remote from a client device.

Modifications, additions, or omissions may be made to FIG. 1 without departing from the scope of the present disclosure. For example, recommendation system 100 may include more or fewer elements than those illustrated and described in the present disclosure. For example, recommendation system 100 may include an integrated display device such as a screen of a tablet or mobile phone or may include an external monitor, a projector, a television, or other suitable display device that may be separate from and communicatively coupled to recommendation system 100. Further, in addition to system 102, recommendation system 100 may include other systems or devices (e.g., remote systems and/or remote devices).

Figure 2:
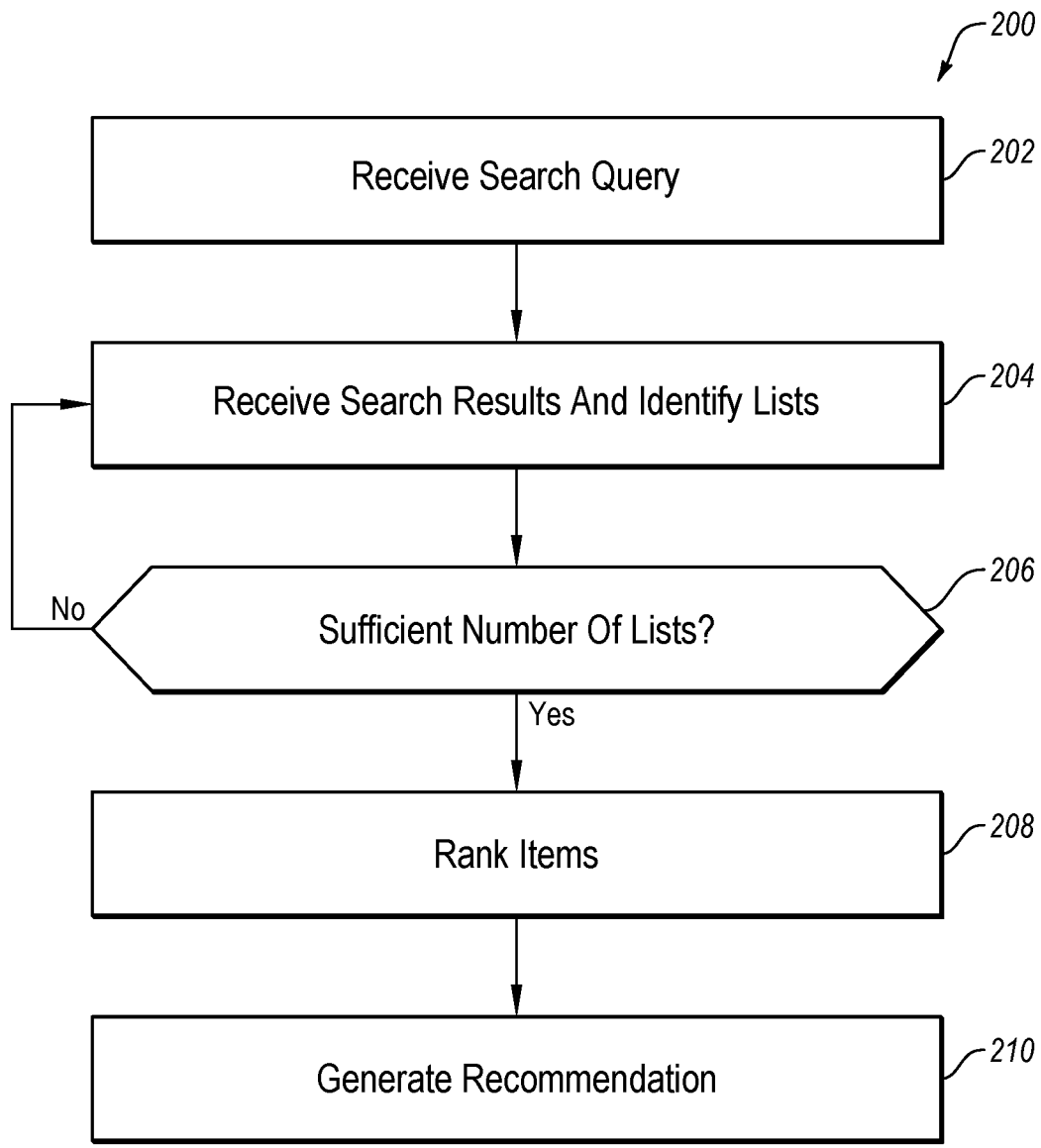
FIG. 2 depicts an example flow diagram of a method of generating recommendations based on human-curated lists.

FIG. 2 illustrates a flowchart of an example method 200 of generating recommendations based on human-curated lists, in accordance with one or more embodiments of the present disclosure. In some embodiments, one or more of the operations associated with method 200 may be performed by recommendation system 100 of FIG. 1. Alternately or additionally, method 200 may be performed by any suitable system, apparatus, or device. For example, processor 104 of system 100 may perform one or more of the operations associated with method 200. Although illustrated with discrete blocks, the steps and operations associated with one or more of the blocks of method 200 may be divided into additional blocks, combined into fewer blocks, or eliminated, depending on the desired implementation.

At block 202, one or more search queries for one or more items may be received, and method 200 may proceed to block 204. Search queries, which may be submitted by a user, may be for specific items such as, for example only, "best video player for iOS," "best flight tracker application," and "best French movies in 2016." For example, processor 104 (see FIG. 1) may receive the one or more search queries.

At block 204, search results may be received and one or more lists may be identified, and method 200 may proceed to block 206. More specifically, for example, Internet search results may be received (e.g., fetched) and one or more human-curated top-k lists (e.g., top 10 lists) may be identified. For example, processor 104 (see FIG. 1) may receive the search results.

Figure 3:
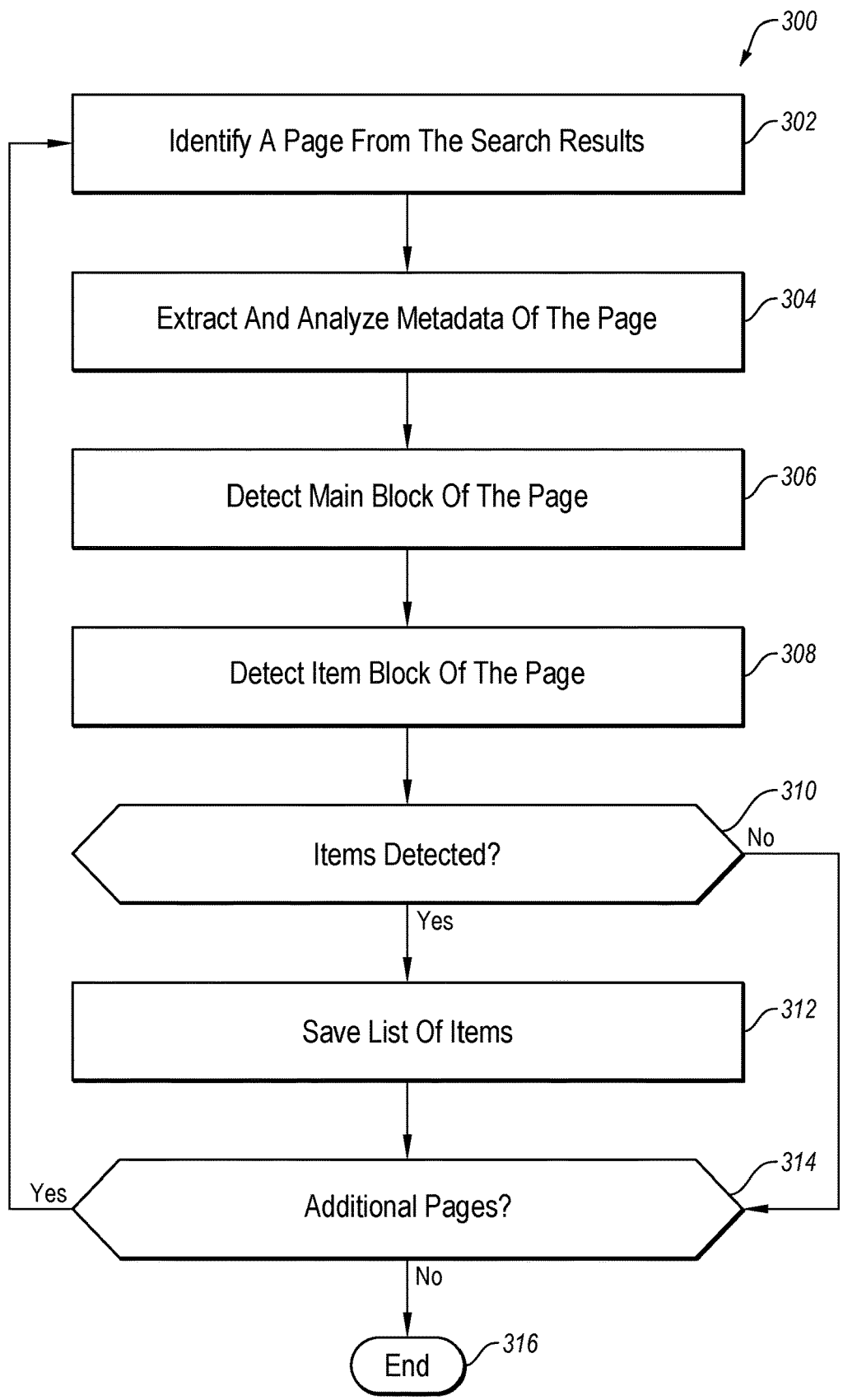
FIG. 3 depicts an example flow diagram of a method of identifying lists in search results.

For example, with reference to FIG. 3, an example method 300 of identifying lists in search results, in accordance with one or more embodiments of the present disclosure, is shown. In some embodiments, one or more of the operations associated with method 300 may be performed by recommendation system 100 of FIG. 1. Alternately or additionally, method 300 may be performed by any suitable system, apparatus, or device. For example, processor 104 of system 100 may perform one or more of the operations associated with method 300. Although illustrated with discrete blocks, the steps and operations associated with one or more of the blocks of method 300 may be divided into additional blocks, combined into fewer blocks, or eliminated, depending on the desired implementation.

At block 302, a webpage including a human-curated list of items may be identified, and method 300 may proceed to block 300. For example, in response to the query "best video player for iOS," a webpage, which identifies, for example, "5 Best Video Players for iPad and iPhone 2017 on iOS 10" may be identified. The webpage may include a list of items (e.g., 5 different video players). For example, processor 104 (see FIG. 1) may identify the webpage.

At block 304, metadata of the webpage may be extracted and analyzed, and method 300 may proceed to block 306. For example, a title of the webpage may be extracted from the webpage. In some examples, a number (e.g., number k), which may be indicative of a number (e.g., 20, 10, 5, 3, etc.) of top items, may be extracted from the title. Further, for example, a date (e.g., month and/or year) may be extracted. For example, for the "5 Best Video Players for iPad and iPhone 2017 on iOS 10" webpage, the number "5" and the year "2017" may be extracted from the webpage (e.g., from the title). For example, processor 104 (see FIG. 1) may extract and analyze the metadata.

At block 306, a main block of the webpage may be detected, and method 300 may procced to block 308. For example, a layout of the webpage may be analyzed to detect the main block of the webpage, which includes the list of items. For example, a webpage may include other information (e.g., advertisements) in addition to a list of items. Accordingly, the webpage may be analyzed to distinguish the list of items from other information that may exist on the webpage. For example, processor 104 (see FIG. 1) may detect the main block of the webpage.

At block 308, an item block of the webpage may be detected, and method 308 may proceed to block 310. For example, based on repeated pattern discovery, the item block of the webpage may be detected. For example, repeated pattern discovery may involve and/or may be based on methods described in U.S. application Ser. No. 13/732,036, which is hereby incorporated by reference in its entirety. Further, block detection (e.g., main block of a webpage, item block of a webpage, etc.) may involve and/or may be based on methods described in U.S. application Ser. No. 14/245, 764, which is hereby incorporated by reference in its entirety.

Figure 4:
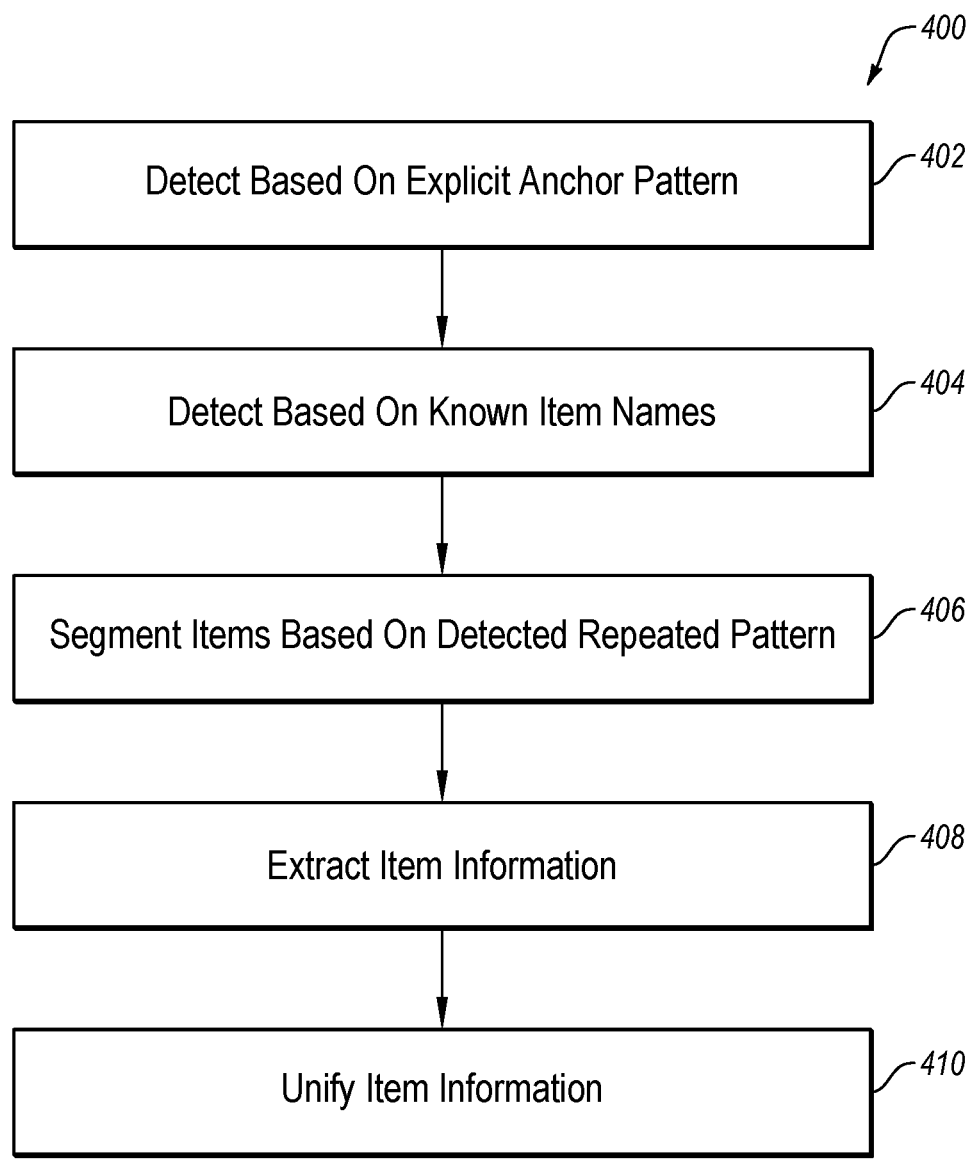
FIG. 4 shows an example flow diagram of a method of detecting item blocks of a webpage.

For example, with reference to FIG. 4, an example method 400 of detecting an item block of a webpage, in accordance with one or more embodiments of the present disclosure, is shown. In some embodiments, one or more of the operations associated with method 400 may be performed by recommendation system 100 of FIG. 1. Alternately or additionally, method 400 may be performed by any suitable system, apparatus, or device. For example, processor 104 of system 100 may perform one or more of the operations associated with method 400. Although illustrated with discrete blocks, the steps and operations associated with one or more of the blocks of method 400 may be divided into additional blocks, combined into fewer blocks, or eliminated, depending on the desired implementation.

At block 402, an anchor pattern may be detected, and method 400 may proceed to block 404. For example, an explicit anchor pattern (e.g., a number pattern in a list of items (e.g., "#1.", "#2.", "#3.", "#4.", "#5." or "1.", "2.", "3.", "4.", "5.")) in the main block may be detected. For example, list may include "#1. [item name 1 ] . . . #2. [item name 2] . . . #3. [item name 3]," wherein a description of item #1 is positioned between item #1 and item #2, and a description of item #2 is positioned between item #2 and item #3, and so on. Further, as an example, if a "top-k" phrase is found in title, "k" may be used to verify detection results. In some embodiments, the webpage may be processed with explicit anchor patterns, and common item names may be accumulated. Further, known item names may be used as an anchor pattern to locate items in webpages without explicit anchor patterns. For example, processor 104 (see FIG. 1) may detect anchor patterns.

At block 404, known item names may be detected, and method 400 may proceed to block 406. For example, names of items in a list may be a short string of characters (e.g., 3-12 characters) displayed in separates line with bold fonts. For example, processor 104 (see FIG. 1) may perform detection based on known item names.

At block 406, items may be segmented (e.g., based on a detected repeated pattern), and method 400 may proceed to block 408. In some examples, anchor pattern positions may be used to locate segmentation borders between items on the webpage. For example, processor 104 (see FIG. 1) may segment items.

At block 408, item information may be extracted, and method 400 may proceed to block 410. For example, a name, a description, a photo, and/or a URL pointing to resource sites for one or more items may be extracted. Some typical resource sites include "itunes/Google play", "IMDB", and "Amazon/Goodread". For example, processor 104 (see FIG. 1) may extract item information.

Figure 5:
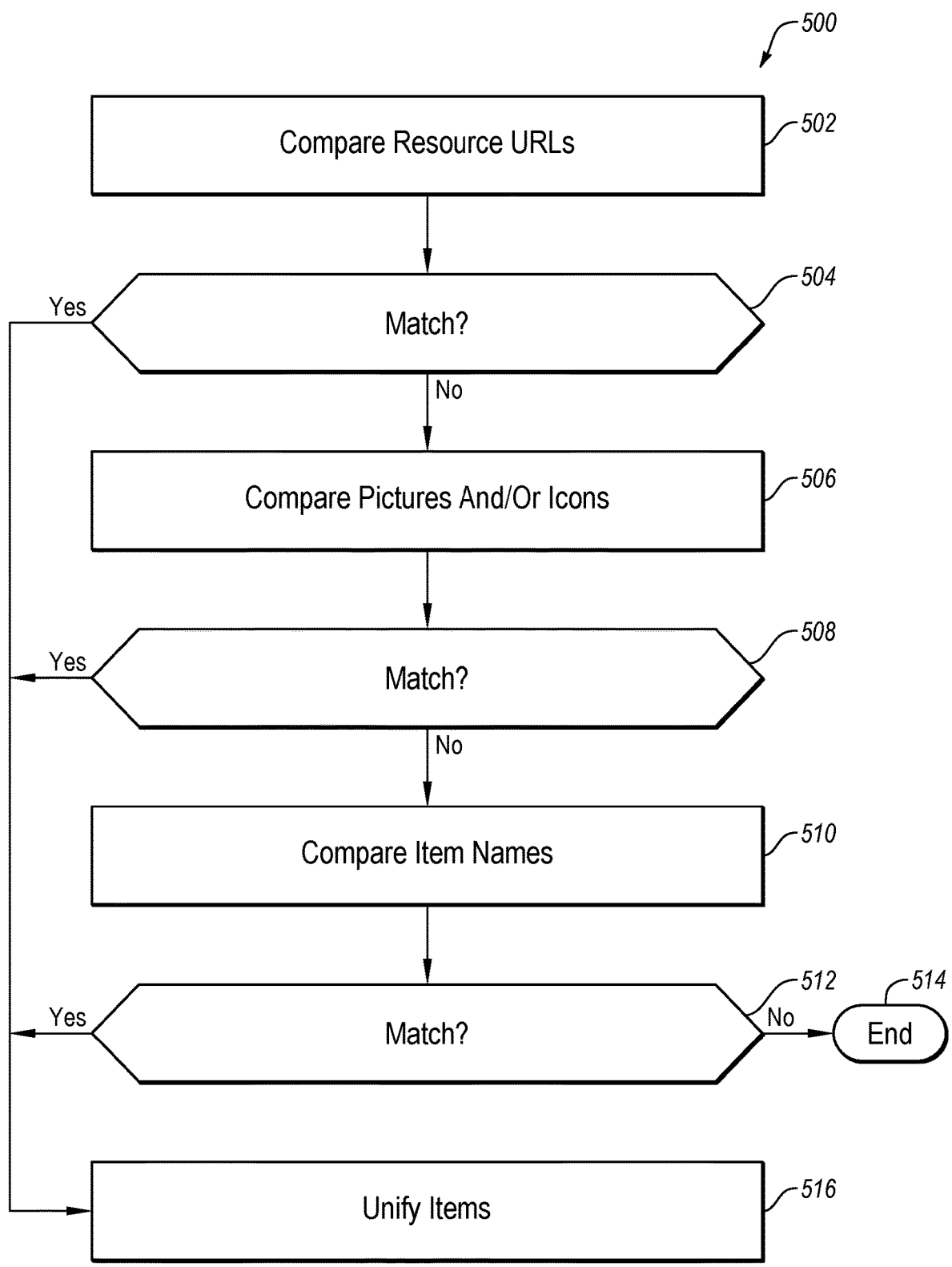
FIG. 5 depicts an example flow diagram of a method of unifying item information.

At block 410, item information may be unified. For example, processor 104 (see FIG. 1) may unify the item information. In some embodiments, items from different lists may refer to the same object and these items may be unified into one single unique item object. For example, with reference to FIG. 5, an example method 500 of unifying item information, in accordance with one or more embodiments of the present disclosure, is shown. In some embodiments, one or more of the operations associated with method 500 may be performed by recommendation system 100 of FIG. 1. Alternately or additionally, method 500 may be performed by any suitable system, apparatus, or device. For example, processor 104 of system 100 may perform one or more of the operations associated with method 500. Although illustrated with discrete blocks, the steps and operations associated with one or more of the blocks of method 500 may be divided into additional blocks, combined into fewer blocks, or eliminated, depending on the desired implementation.

At block 502, extracted resource URLs for a plurality of items in different lists may be compared, and method 500 may proceed to block 504. For example, processor 104 (see FIG. 1) may compare resource URLs.

At block 504, a determination may be made as to whether there is a match between resource URLs of two or more items. If there is a match, method 500 may proceed to block 516. If there is not a match, method 500 may proceed to block 506. For example, processor 104 (see FIG. 1) may determine whether or not there is a match between two or more compared resource URLs.

At block 506, pictures and/or icons for a plurality of items may be compared, and method 500 may proceed to block 508. For example, processor 104 (see FIG. 1) may compare the picture and/or icons.

At block 508, a determination may be made as to whether there is a match between pictures and/or icons for two or more items. If there is a match, method 500 may proceed to block 516. If there is not a match, method 500 may proceed to block 510. For example, processor 104 (see FIG. 1) may determine whether or not there is a match between picture and/or icons for two or more items.

At block 510, names of a plurality of items may be compared, and method 500 may proceed to block 512. For example, processor 104 (see FIG. 1) may compare the names.

At block 512, a determination may be made as to whether there is a match between the names of two or more items. In some embodiments, if two names are similar but are not exactly the same (e.g., different spelling), the two names may be considered a match. If there is a match, method 500 may proceed to block 516. If there is not a match, method 500 may end at block 514. For example, processor 104 (see FIG. 1) may determine whether or not there is a match between names for two or more items.

At block 516, items having a match with one or more other items may be unified into a single item. For example, processor 104 (see FIG. 1) may unify two or more items into a single item.

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Further, modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Returning to FIG. 3, at block 310, a determination may be made as to whether one or more items have been detected. If one or more items have been detected, method 300 may proceed to block 312. If one or more items have not been detected, method 300 may proceed to block 314. For example, processor 104 (see FIG. 1) may determine whether one or more items have been detected.

At block 312, the list of items may be saved, and method 300 may proceed to block 314. For example, processor 104 (see FIG. 1) may save the list in memory 106 (see FIG. 1).

At block 314, a determination may be made as to whether an additional webpage exists. If an additional webpage exists, method 300 may return to block 302. If an additional webpage does not exist, method 300 may end at block 316. For example, processor 104 (see FIG. 1) may determine whether an additional webpage exists.

Modifications, additions, or omissions may be made to method 300 without departing from the scope of the present disclosure. For example, the operations of method 300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment Returning to FIG. 2, at block 206, a determination may be made as to whether or not a sufficient number of lists (e.g., a selectable number, such as 2, 4, 6, 10, 15, etc.) have been identified. For example, processor 104 of FIG. 1 may determine if a sufficient number of lists (e.g., a plurality of lists) have been identified. If a sufficient number of lists have been identified, method 200 may proceed to block 208. If a sufficient number of lists have not been identified, method 200 may return to block 204.

Figure 7:
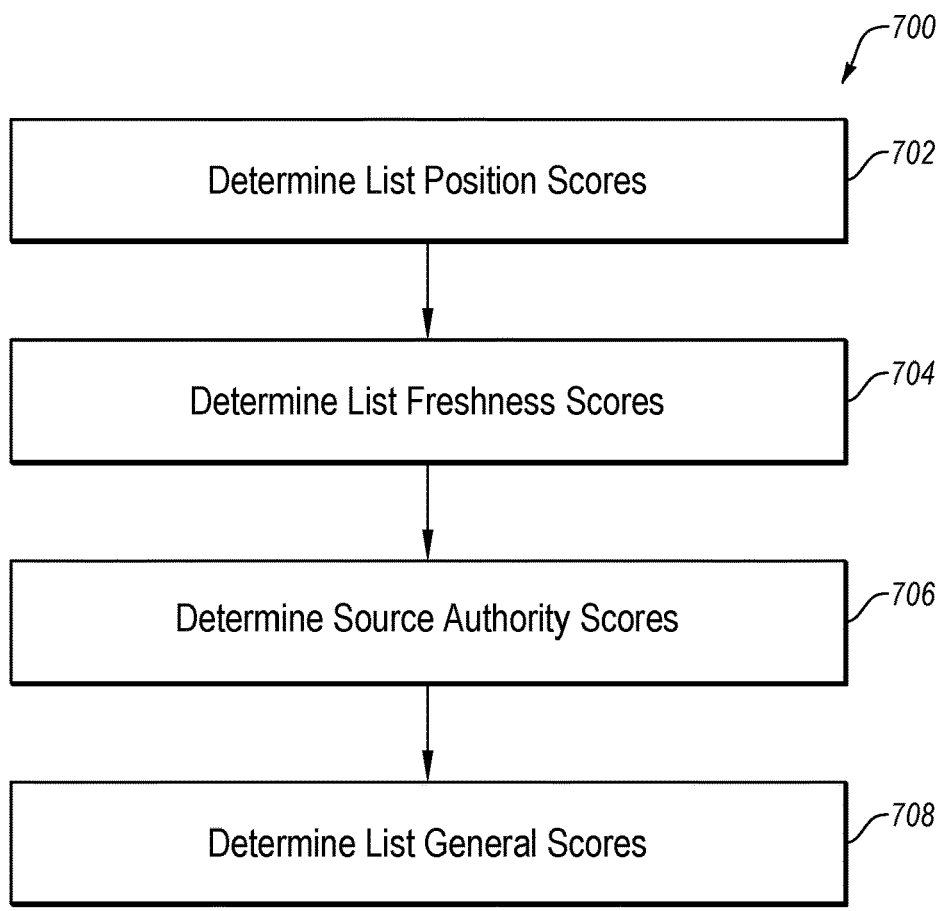
FIG. 7 shows an example flow diagram of a method of calculating list-specific scores.

At block 208, items within the identified lists may be ranked, and method 200 may proceed to block 210. For example, the items of the identified lists may be ranked via one or more analyses (e.g., one or more calculated scores). For example, processor 104 (see FIG. 7) may rank the items.

Figure 6:
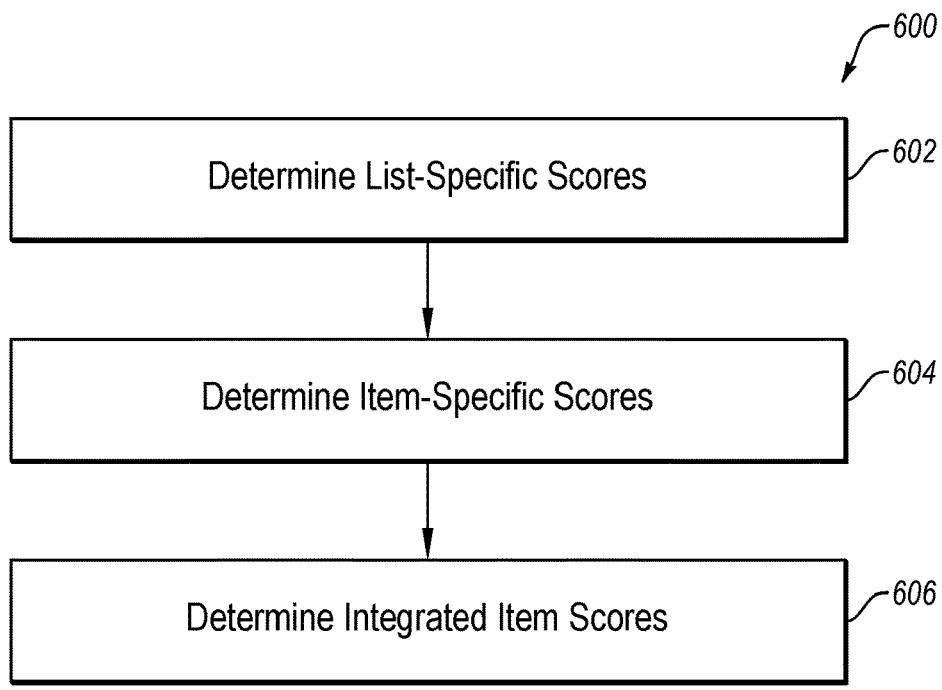
FIG. 6 shows an example flow diagram of a method of ranking items.

For example, with reference to FIG. 6, an example method 600 of ranking items within identified lists, in accordance with one or more embodiments of the present disclosure, is shown. In some embodiments, one or more of the operations associated with method 600 may be performed by recommendation system 100 of FIG. 1. Alternately or additionally, method 600 may be performed by any suitable system, apparatus, or device. For example, processor 104 of system 100 may perform one or more of the operations associated with method 600. Although illustrated with discrete blocks, the steps and operations associated with one or more of the blocks of method 600 may be divided into additional blocks, combined into fewer blocks, or eliminated, depending on the desired implementation.

At block 602, list-specific scores for each identified list may be determined, and method 600 may proceed to block 604. For example, processor 104 (see FIG. 7) may calculate list-specific scores. For example, with reference to FIG. 7, an example method 700 of determining list-specific scores, in accordance with one or more embodiments of the present disclosure, is shown. In some embodiments, one or more of the operations associated with method 700 may be performed by recommendation system 100 of FIG. 1. Alternately or additionally, method 700 may be performed by any suitable system, apparatus, or device. For example, processor 104 of system 100 may perform one or more of the operations associated with method 700. Although illustrated with discrete blocks, the steps and operations associated with one or more of the blocks of method 700 may be divided into additional blocks, combined into fewer blocks, or eliminated, depending on the desired implementation.

At block 702, list position scores for each list may be determined, and method 700 may proceed to block 704. For example, in some embodiments, list position scores (e.g., a position of a list in search results) may be provided by a search engine. In these embodiments, the list position scores provided by the search engine may be used. In other embodiments, a list position score for each list may be calculated (e.g., via processor 104 of FIG. 1) based on a positions of the list in the search results. More specifically, for example, a list position score for a list may be calculated according to the following equation:

$$list\_pos\_score = 1 - (ListPos/M);$$

wherein ListPos is the position in the search results, and M is the total number of webpages in the search results. For example, processor 104 (see FIG. 7) may determine the list position scores.

At block 704, list freshness scores for each list may be determined, and method 700 may proceed to block 706. For example, for each list, a freshness score may be calculated according to the following equation:

$$\text{Freshness score} = e^{-\lambda \cdot (t - t_j)};$$

wherein $\lambda$ is a constant factor (e.g., for adjusting time impact), t is the current time (e.g., current date, such as day, month, year), $t_j$ is time associated with the list (e.g., jth list) (e.g., date the list was generated (e.g., day, month, year)).

Time $t_j$ may be in days or hours based on a requirement and may be normalized among all lists. For example, processor 104 (see FIG. 7) may determine the list freshness scores.

At block 706, source authority scores for each list may be determined, and method 700 may proceed to block 708. For example, for each list, an authority score may be calculated based on one or more factors related to the source (e.g., a website) of the list (e.g., popularity of the source, webpage rank, webpage views, etc.). For example, processor 104 (see FIG. 7) may determine the source authority scores.

At block 708, list general scores for each list may be determined. For example, for each list, a general score may be determined based on a list position score, a list freshness score, and/or a source authority score. More specifically, for example, a general score may be calculated based on a product or a linear combination of two or more of a list position score, a list freshness score, and a source authority score. For example, processor 104 (see FIG. 7) may determine the list general scores.

Figure 8:
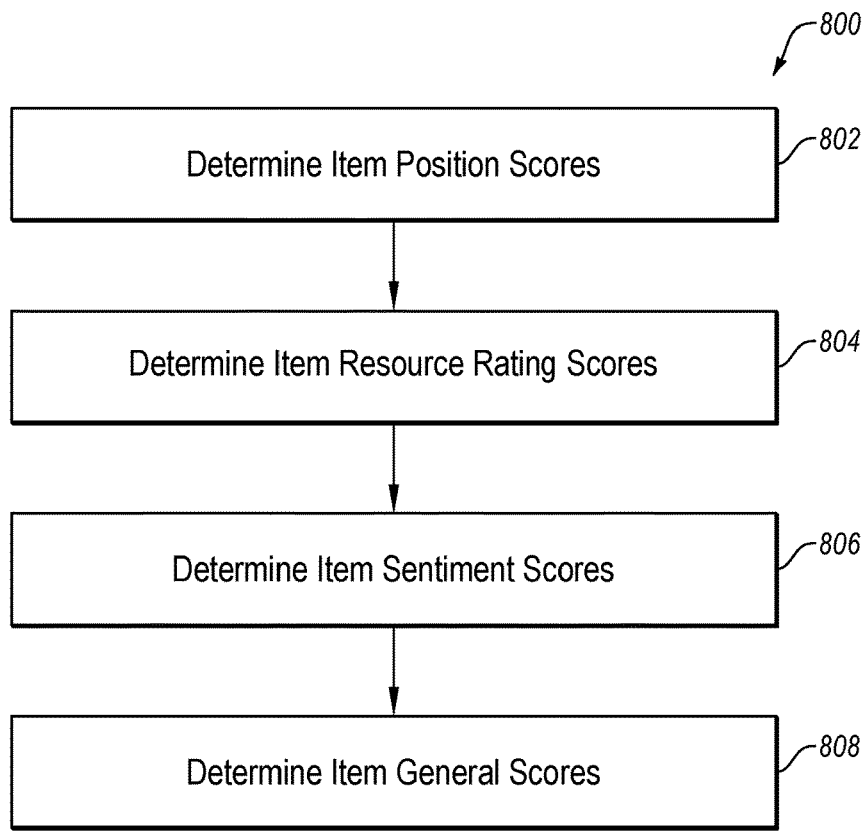
FIG. 8 depicts an example flow diagram of a method of calculating item-specific scores.

Modifications, additions, or omissions may be made to method 700 without departing from the scope of the present disclosure. For example, the operations of method 700 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment Returning to FIG. 6, at block 604, item-specific scores for each item of each list may be determined, and method 600 may proceed to block 606. For example, processor 104 (see FIG. 7) may determine the source authority scores. For example, with reference to FIG. 8, an example method 800 of determining item specific scores, in accordance with one or more embodiments of the present disclosure, is shown. In some embodiments, one or more of the operations associated with method 800 may be performed by recommendation system 100 of FIG. 1. Alternately or additionally, method 800 may be performed by any suitable system, apparatus, or device. For example, processor 104 of system 100 may perform one or more of the operations associated with method 800. Although illustrated with discrete blocks, the steps and operations associated with one or more of the blocks of method 800 may be divided into additional blocks, combined into fewer blocks, or eliminated, depending on the desired implementation.

At block 802, item position scores for each item may be determined, and method 800 may proceed to block 804. For example, for each item in each list, an item position score may be determined. More specifically, for example, an item position score for each item may be calculated according to the following equation:

$$item\_pos\_score = 1 - F * (ItemPos/N);$$

wherein ItemPos is the position of the item in a list, N is the total number of the items in the list, and F is an adjust factor. For example, processor 104 (see FIG. 1) may determine the item position scores.

At block 804, item resource rating scores for each item may be determined, and method 800 may proceed to block 806. For example, based on reviews and/or ratings of the item (e.g., user reviews and/or user ratings), a resource rating score may be determined. In some embodiments, a resource rating score for each item may be normalized (e.g., between 0 and 1). For example, processor 104 (see FIG. 1) may determine the resource rating scores.

At block 806, item sentiment scores for each item may be determined, and method 800 may proceed to block 808. For example, for each item, a text of the description of the item may be analyzed to determine a sentiment score. Further, in some embodiments, sentiment lexicons may be extracted. For example, processor 104 (see FIG. 1) may determine the sentiment scores.

At block 808, item general scores may be determined. For example, for each item in each list, a general score may be determined based on a position score, a resource rating score, and/or a sentiment score. More specifically, for example, a general score may be calculated based on a linear combination of two or more of a position score, a resource rating score, and a sentiment score. For example, processor 104 (see FIG. 7) may determine the item general scores.

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment Returning to FIG. 6, at block 606, integrated item scores may be determined. For example, for each item, based on the product of an item's general score and its corresponding list general score, an integrated item score may be calculated. Further, for an item that is present in more than one list, an average integrated item score may be determined. For example, a mutual reinforcement relationship between lists and items may be used to calculate integrated item scores. More specifically, for example, a mutually reinforcing relationship between curated list U and unified items C may be encoded in a bipartite graph. For a list u, the set of all items curated in u may defined as C_u, and for an item c, the set of all lists curating and promoting item c may be defined as U_c. If a list u promotes an item c, a promotional link may be defined as (u, c), and a basic link strength may be defined as s(u, c)=list_general_score(u)*item_position_score(u, c). $r_u(u)$ and $r_c(c)$ (see equations below) may be respectively defined as the ranking of list u and item c, and the values of $r_u(u)$ and $r_c(c)$ may propagate through a bipartite graph and converge after multiple-round iterations and normalization. An integrated item score may be a linear combination of $r_c(c)$ and an item sentiment score, and an item resource rating score. For example, processor 104 (see FIG. 7) may determine the integrated item scores.

$$r_c(c) = \sum_{u' \in U_c} s(u', c) r_u(r')$$

$$r_u(u) = \sum_{c' \in C_u} s(u, c') r_c(c') / \left( \sum_{c' \in C_u} s(u, c') \right)^\alpha$$

Modifications, additions, or omissions may be made to method 600 without departing from the scope of the present disclosure. For example, the operations of method 600 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Returning to FIG. 2, at block 210, a recommendation may be generated. In some embodiments, as described in below with reference to FIG. 9, the ranked items may be analyzed (e.g., from multiple aspects) to generate the recommendation. For example, for each ranked item, one or more modifier phrases, sentiment expressions, and/or item statistics may be analyzed to generate item data for each item of the ranked items. Further, in at least some embodiments, the recommendation may include a visualization aspect (e.g., showing a list of the ranked items and/or item data for at least one item in the recommendation). For example, processor 104 (see FIG. 7) may generate the recommendation.

Figure 9:
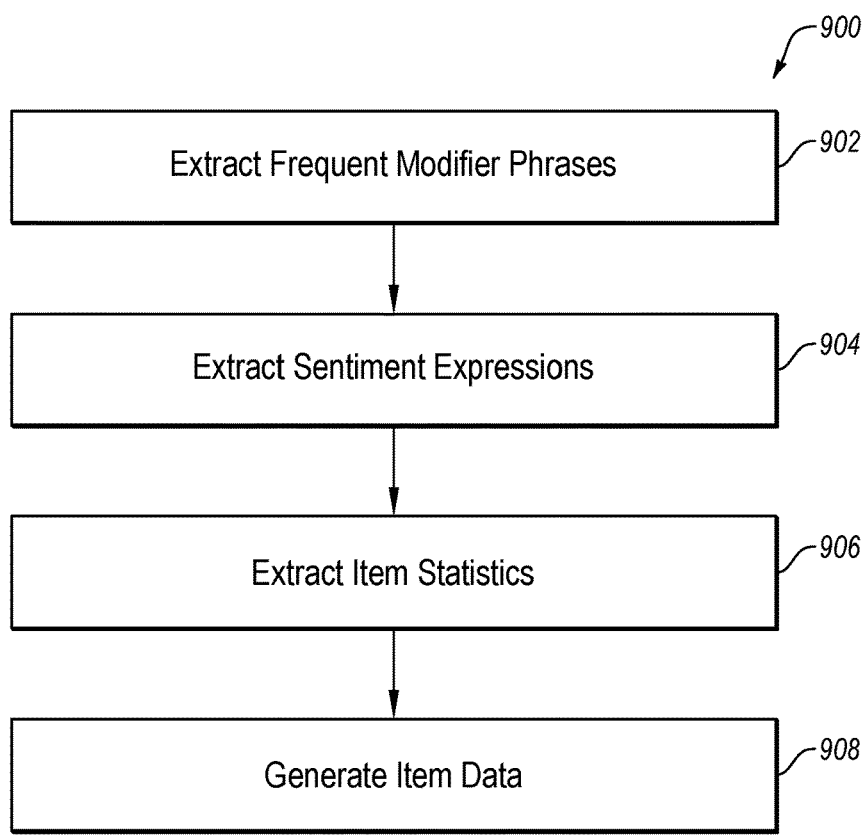
FIG. 9 shows an example flow diagram of a method of generating item data.

For example, with reference to FIG. 9, an example method 900 of generating item data (e.g., via multi-aspect item analysis), in accordance with one or more embodiments of the present disclosure, is shown. In some embodiments, one or more of the operations associated with method 900 may be performed by recommendation system 100 of FIG. 1. Alternately or additionally, method 900 may be performed by any suitable system, apparatus, or device. For example, processor 104 of system 100 may perform one or more of the operations associated with method 900. Although illustrated with discrete blocks, the steps and operations associated with one or more of the blocks of method 900 may be divided into additional blocks, combined into fewer blocks, or eliminated, depending on the desired implementation.

At block 902, one or more modifier phrases of one or more ranked items may be extracted, and method 900 may proceed to block 904. For example, for each item, one or more modifier phases (e.g., see modifier phrases 1004 in FIG. 10) in a title of the item may be identified and extracted. For example, processor 104 (see FIG. 7) may identify and extract modifier phrases.

At block 904, one or more sentiment expressions one or more ranked items may be extracted, and method 900 may proceed to block 906. For example, for each item, one or more sentiment expressions (e.g., "superior," "awe-inspiring," "dreadful," "horrible," etc.) in a description of the item may be identified and extracted. For example, processor 104 (see FIG. 7) may identify and extract sentiment expression.

At block 906, item statistics for one or more ranked items may be extracted, and method 900 may proceed to block 908. For example, for each item, statistics related to the item (e.g., item scores, such as one or more scores determined via method 800) and/or a list including the item (e.g., list scores, such a one or more scores determined via method 700) may be identified and extracted. For example, processor 104 (see FIG. 1) may identify and extract item statistics.

Figure 10:
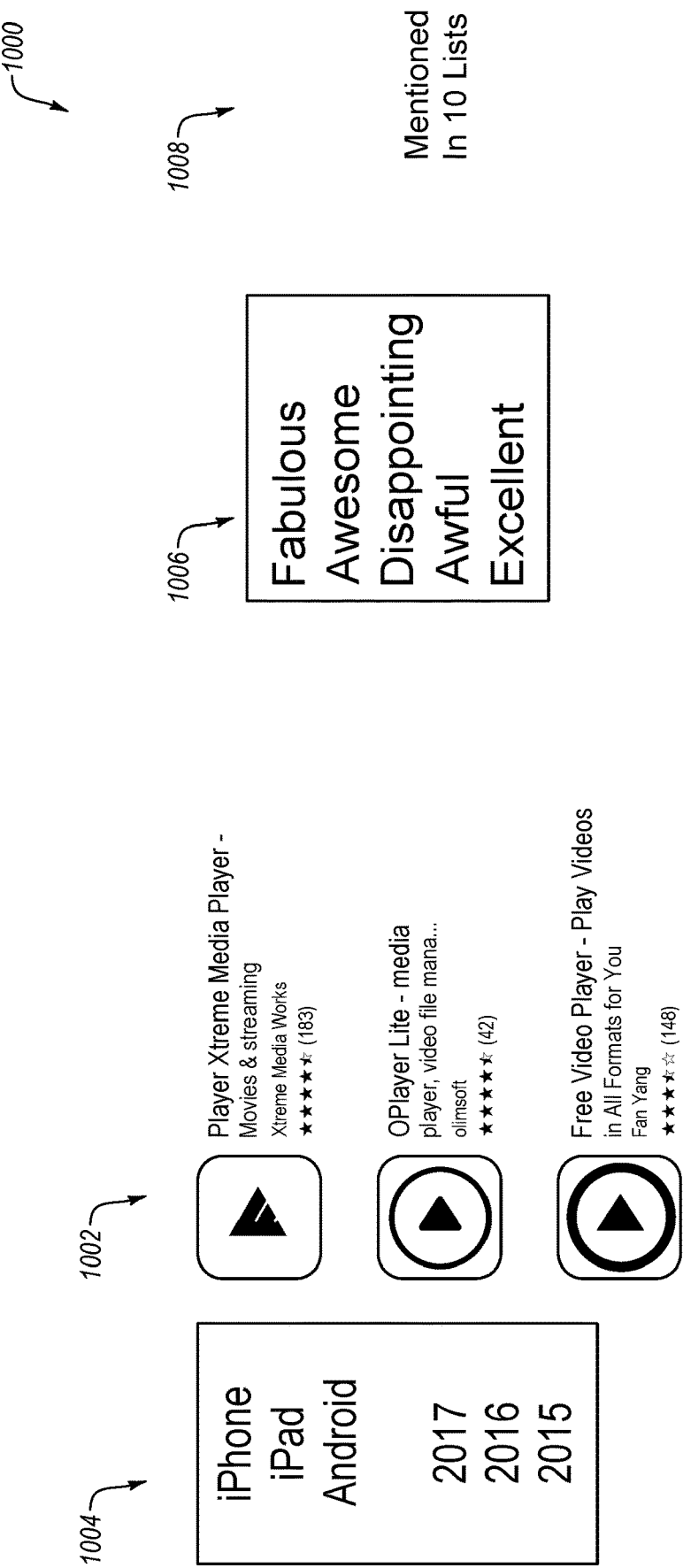
FIG. 10 illustrates an example recommendation.

At block 908, item data may be generated. For example, the item data, which may be included in a recommendation, may be based on extracted data (e.g., via acts at blocks 902, 904, and/or 906). Further, for example, the item data may be accessible to a user (e.g., via a link or a pop-up window). More specifically, for each item, item data (e.g., modifier phrases, sentiment expressions, items statistics, etc.) may be accessible (e.g., upon selection of an item in the recommended list). For example, FIG. 10 shows an example recommendation 1000, which may be displayed (e.g., via a GUI) to a user. As illustrated, recommendation 1000 includes a list 1002 of recommended items (e.g., video players), including item data, such as modifier phrases 1004, sentiment expressions 1006, and item statistics 1008. For example, processor 104 (see FIG. 1) may generate and display the item data.

Modifications, additions, or omissions may be made to method 900 without departing from the scope of the present disclosure. For example, the operations of method 900 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Further, modifications, additions, or omissions may be made to method 200 without departing from the scope of the present disclosure. For example, the operations of method 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of generating a recommendation for an item, the method comprising:
   receiving, via at least one processor, search results based on a query for an item;
   identifying, via the at least one processor, a plurality of human-curated lists from the search results, each human-curated list of the plurality of human-curated lists including a plurality of human-recommended items by:
      selecting, via the at least one processor, a webpage of the search results;
      detecting, via the at least one processor, a main block of the selected webpage;
      determining, via the at least one processor, if the main block of the selected webpage includes a plurality of items in response to the query for the item; and
      in response to the selected webpage including a plurality of items in response to the query for the item, identifying, via the at least one processor, the webpage as a human-curated list;
   determining, via the at least one processor, one or more scores associated with at least one of the plurality of human-curated lists and the plurality of human-recommended items;
   generating, via the at least one processor, a recommendation including at least one recommended item based on the determined one or more scores; and
   displaying, via the at least one processor, the recommended item,
   wherein determining if the main block of the selected webpage includes a plurality of items in response to the query for the item comprises:
      detecting, via the at least one processor, a plurality of items in response to the query for the item based on at least one of an anchor pattern and known item names;
      segmenting, via the at least one processor, the plurality of detected items;
      extracting, via the at least one processor, item information for each of the plurality of detected items;
      comparing, via the at least one processor, item information for two or more detected items of the plurality of detected items; and
      in response to a match between item information for the two or more detected items, identifying, via the at least one processor, the two or more detected items as a single item.

2. The method of claim 1, wherein comparing item information comprises comparing, via the at least one processor, at least one of:
   uniform resource locators (URLs) for the two or more detected items;
   pictures of the two or more detected items;
   icons for the two or more detected items; and
   names of the two or more detected items.

3. The method of claim 1, wherein determining one or more scores comprises:
   determining, via the at least one processor, one or more list-specific scores for each human-curated list of the plurality of human-curated lists;
   determining, via the at least one processor, one or more item-specific scores for each human-recommended item of each human-curated list of the plurality of human-curated lists;
   determining, via the at least one processor, a general score for each human-curated list based on the one or more list-specific scores; and determining, via the at least one processor, a general score for each human-recommended item based on the one or more item-specific scores.

4. The method of claim 3, wherein determining one or more list-specific scores for each human-curated list comprises:
  determining, via the at least one processor, a list position score for each human-curated list;
  determining, via the at least one processor, a list freshness score for each human-curated list; and
  determining, via the at least one processor, a source authority score for each human-curated list.

5. The method of claim 3, wherein determining one or more item-specific scores for each human-recommended item of each human-curated list comprises:
  determining, via the at least one processor, an item position score for each human-recommended item;
  determining, via the at least one processor, an item resource rating score for each human-recommended item; and
  determining, via the at least one processor, an item sentiment score for each human-recommended item.

6. The method of claim 1, further comprising, for each recommended item of the at least one recommended item:
  identifying, via the at least one processor, at least one modifier phrase associated with the at least one recommended item;
  identifying, via the at least one processor, at least one sentiment expression associated with the at least one recommended item;
  identifying, via the at least one processor, at least one statistic associated with the at least one recommended item; and
  generating, via the at least one processor, item data for the at least one recommended item including at least one of the at least one modifier phrase, the at least one sentiment expression, and the at least one statistic associated with the at least one recommended item.

7. The method of claim 6, wherein displaying the recommended item comprises displaying, via the at least one processor, the item data with a ranking of the at least one recommended item.

8. The method of claim 1, wherein generating the recommended item comprises ranking, via the at least one processor, one or more of the human-recommended items as recommended items based on the one or more determined scores.

9. One or more non-transitory computer-readable media that include instructions that, when executed by one or more processing systems, are configured to cause the processing system to perform operations, the operations comprising:
  receiving search results based on a query for an item;
  identifying a plurality of human-curated lists from the search results, each human-curated list of the plurality of human-curated lists including a plurality of human-recommended items by:
    selecting a webpage of the search results;
    detecting a main block of the selected webpage;
    determining if the main block of the selected webpage includes a plurality of items in response to the query for the item; and
    in response to the selected webpage including a plurality of items in response to the query for the item, identifying the webpage as a human-curated list;
  determining one or more scores associated with the human-curated lists and the human-recommended items of the human-curated lists;
  generating a recommendation including at least one recommended item based on the determined one or more scores; and
  displaying the recommendation for the recommended item,
  wherein determining if the main block of the selected webpage includes a plurality of items in response to the query for the item comprises:
    detecting a plurality of items in response to the query for the item based on at least one of an anchor pattern and known item names;
    segmenting the plurality of detected items;
    extracting item information for each of the plurality of detected items;
    comparing item information for two or more detected items of the plurality of detected items; and
    in response to a match between item information for the two or more detected items, identifying the two or more detected items as a single item.

10. The non-transitory computer-readable media of claim 9, wherein comparing item information comprises comparing at least one of:
  uniform resource locators (URLs) for the two or more detected items;
  pictures of the two or more detected items;
  icons for the two or more detected items; and
  names of the two or more detected items.

11. The non-transitory computer-readable media of claim 9, wherein determining one or more scores comprises:
  determining one or more list-specific scores for each human-curated list of the plurality of human-curated lists;
  determining one or more item-specific scores for each human-recommended item of each human-curated list of the plurality of human-curated lists;
  determining a general score for each human-curated list based on the one or more list-specific scores; and
  determining a general score for each human-recommended item based on the one or more item-specific scores.

12. The non-transitory computer-readable media of claim 11, wherein determining one or more list-specific scores for each human-curated list comprises:
  determining a list position score for each human-curated list;
  determining a list freshness score for each human-curated list; and
  determining a source authority score for each human-curated list.

13. The non-transitory computer-readable media of claim 11, wherein determining one or more item-specific scores for each human-recommended item of each human-curated list comprises:
  determining an item position score for each human-recommended item;
  determining an item resource rating score for each human-recommended item; and
  determining an item sentiment score for each human-recommended item.

14. The non-transitory computer-readable media of claim 11, the operations further comprising:
  identifying at least one modifier phrase associated with the at least one recommended item;
  identifying at least one sentiment expression associated with the at least one recommended item;
  identifying at least one statistic associated with the at least one recommended item; and generating item data for the at least one recommended item including at least one of the at least one modifier phrase, the at least one sentiment expression, and the at least one statistic associated with the at least one recommended item.

15. The non-transitory computer-readable media of claim 14, wherein displaying the recommended item comprises displaying, via the at least one processor, the item data with a ranking of the at least one recommended item.

16. The non-transitory computer-readable media of claim 9, wherein generating the recommended item comprises ranking, via the at least one processor, one or more of the human-recommended items as recommended items based on the one or more determined scores.

* * * * *